July 29, 1969   F. G FREEMAN   3,457,939
ELECTRICALLY OPERATED FLUID FLOW CONTROL DEVICES
Filed June 21, 1966

United States Patent Office 3,457,939
Patented July 29, 1969

3,457,939
ELECTRICALLY OPERATED FLUID FLOW
CONTROL DEVICES
Frank George Freeman, Solihull, England, assignor to
Joseph Lucas (Industries) Limited, Birmingham, England, a British company
Filed June 21, 1966, Ser. No. 559,208
Int. Cl. F15b 5/00
U.S. Cl. 137—83   3 Claims

ABSTRACT OF THE DISCLOSURE

An electrically operated fluid flow control device comprising a body, a deflectable member mounted at one end in the body and being arranged at its other end to control the flow of fluid to an orifice in the body, an electromagnetic device having a movable armature arranged upon energization of the electromagnetic device to deflect the member and a cam acting between the armature and the deflectable member, the surface of the cam being arranged to vary the leverage exerted by the armature on the member as the distance moved by the armature varies.

---

This invention relates to fluid flow control devices whereby the control of flow of fluid takes place in response to the actuation of an electromagnetic device.

It is a well known fact that in electromagnetic devices of the kind having a coil through which current is passed to set up a magnetic field between a core and a movable armature, the magnetic force exerted on the armature varies inversely as the square of the distance between the armature and the core of the electromagnetic device. When applied to flow control devices, the flow control response to electrical current supplied is in substantially the same proportion.

It is the object of this invention to provide a flow control device in which flow control response is modified in a convenient manner.

In accordance with the present invention, an electrically operated fluid flow control device comprises a body, a deflectable member mounted at one end in the body and being arranged at its other end to control the flow of fluid to an orifice in the body, an electromagnetic device having a movable armature arranged, upon energization of the electromagnetic device, to deflect the member to cause it to vary the flow of fluid through said orifice, the armature acting upon the deflectable member between its ends through the intermediary of a cam whereby the leverage exerted by the armature on the member alters as the distance moved by the armature increases.

The invention will now be described with reference to the accompanying drawings in which:

FIGURE 1 is a cross-sectional view of one form of the invention,

Figure 2:
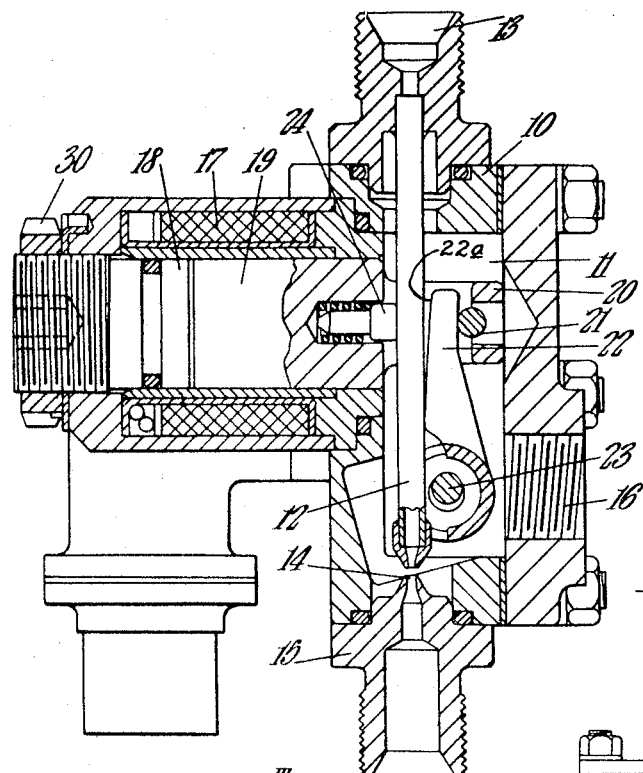
FIGURE 2 is a similar view of a modified form of the invention.

In the construction shrown in FIGURE 1 a device for controlling the flow of fluid comprises a body 10 defining an interior chamber 11 through which extends a tube 12 communicating with a fluid inlet 13, and the tube is fixed at this end within the body. The opposite free end of this tube 12 terminates adjacent to an orifice 14 formed in an outlet member 15 for fluid. The tube 12 is resilient and can be deflected so that the end of the tube 12 is not immediately opposite and coaxial with the orifice 14. A further outlet 16 from the chamber 11 permits the escape of fluid from the tube 12, which does not pass through the outlet 15.

To deflect the tube 12, there is provided an electromagnetic device comprising a coil 17 within which is mounted a fixed core 18 and a movable armature 19, the latter having connected thereto a yoke 20 between the arms of which the tube 12 passes. Across the end of the yoke remote from the coil 17 is a pin 21 having a surface 22a bearing on the side of the tube 12. The cam 22 bears upon a cam 22 which is pivotally mounted on antifriction bearings about the axis 23 in the body. Acting to press the tube 12 against the cam 22 is a spring-loaded plunger 24 carried in the armature 19.

In use, upon energization of the coil 17, the armature is moved to deflect the tube 12, the armature 19 acting upon the tube 12 through the intermediary of the cam 22. Progressive movement of the cam 22 causes successive portions of the surface 22a to engage the tube 12 thus altering the leverage exerted by the armature 19 on the tube 12. The axis 23 about which the cam 22 moves can be altered to vary the position of the cam longitudinally of the tube 12. The tube 12 will return to its initial position under the action of its own resilience. The electromagnetic device would, in the absence of the cam 22 cause a deflection of the tube 12 which would be related to the current supplied to the coil 17 in approximately the same proportion as the magnetic force exerted upon the armature, which varies inversely as the square of the distance between the core 18 and armature 19. The shape of the cam surface 22a is so calculated that the degree of proportionality is altered so that current supplied to the coil 17 varies the flow of fluid between the tube 12 and orifice 14 in substantially direct proportions.

Figure 3:
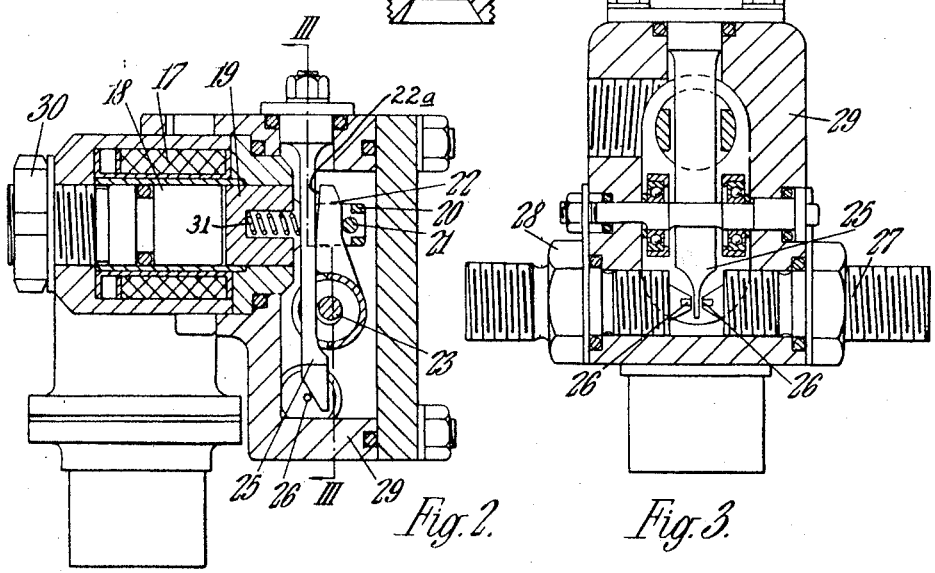
FIGURE 3 is a cross-sectional view on the line III—III in FIGURE 2.

The example shown in FIGURES 2 and 3 operates on substantially the same basis as that of FIGURE 1, but the fluid flow is controlled by means of an obturator member 25 which takes the place of the tube 12, and which upon energization of the electromagnetic device is inserted between a pair of orifices 26 in inlet and outlet members 27, 28 respectively mounted in the body 29. The plunger 24 is omitted from this construction and a spring 31 acts directly between the armature 19 and the member 25.

It will be seen that in this construction as well as in that of FIGURE 1, the distance between the core 18 and armature 19 can be adjusted by means of a nut 30.

I claim:

1. An electrically operated fluid control device comprising a body, the body having an orifice through which fluid can flow in use, a deflectable member having opposite ends and pivotally mounted at one end thereof in the body, the opposite end of the deflectable member being arranged to control the flow of fluid through the orifice, an electromagnetic device, a movable armature in the electromagnetic device, a cam in the form of a pivotal lever extending parallel to the deflectable member whose axis is parallel to the axis of the deflectable member acting between the armature and the deflectable member, means mounting the cam in the body for pivotal movement relative to the deflectable member, biasing means operably related to the armature and deflectable member urging the deflectable member against the cam and the cam having a surface extending along a substantial portion the lever successive portions of which engage the deflectable member as the armature moves to vary the leverage exerted by the armature on the deflectable member.

2. The device as claimed in claim 1 in which the deflectable member is provided with a passage for the flow of fluid, the opposite end being disposed adjacent to an orifice in the body, the degree of deflection determining the flow of fluid between the opposite end of the member and said orifice.

3. The device as claimed in claim 1 in which the deflectable member is an obturator positioned adjacent to a pair of aligned orifices in the body, with the flow of fluid between the orifices being determined by the position of the obturator with respect to said orifices.

References Cited
UNITED STATES PATENTS

| | | | |
|---|---|---|---|
| 3,245,425 | 4/1966 | De Meyer | 137—86 |
| 2,858,849 | 11/1958 | Griffith | 137—83 X |
| 2,889,921 | 6/1959 | Maki | 251—183 X |
| 3,082,781 | 3/1963 | Moosmann | 137—83 |
| 3,315,250 | 4/1967 | Higgins | 137—82 X |

ALAN COHAN, Primary Examiner